US012267925B2

(12) United States Patent
Chu et al.

(10) Patent No.: US 12,267,925 B2
(45) Date of Patent: Apr. 1, 2025

(54) MULTI-CHANNEL LED CURRENT CONTROL CIRCUIT

(71) Applicant: UnitX, Inc., Santa Clara, CA (US)

(72) Inventors: Yen-Chia Chu, San Jose, CA (US); Boyun Wang, Santa Clara, CA (US)

(73) Assignee: UnitX, Inc., Santa Clara, CA (US)

( * ) Notice: Subject to any disclaimer, the term of this patent is extended or adjusted under 35 U.S.C. 154(b) by 44 days.

(21) Appl. No.: 17/983,350

(22) Filed: Nov. 8, 2022

(65) Prior Publication Data

US 2024/0155752 A1 May 9, 2024

(51) Int. Cl.

| | |
|---|---|
| ***H05B 45/24*** | (2020.01) |
| ***H05B 45/325*** | (2020.01) |
| ***H05B 45/375*** | (2020.01) |
| ***H05B 45/58*** | (2020.01) |

(52) U.S. Cl.

CPC ......... *H05B 45/375* (2020.01); *H05B 45/325* (2020.01); *H05B 45/58* (2020.01)

(58) Field of Classification Search

CPC ........ H05B 45/00; H05B 45/10; H05B 45/20; H05B 45/37; H05B 45/325; H05B 45/335; H05B 45/375; H05B 45/24; H05B 45/58

See application file for complete search history.

(56) References Cited

U.S. PATENT DOCUMENTS

| | | | | |
|---|---|---|---|---|
| 11,240,895 | B2 * | 2/2022 | Qiu | H05B 45/20 |
| 11,734,812 | B2 | 8/2023 | Wang | |
| 11,763,442 | B2 | 9/2023 | Wang | |
| 2011/0187276 | A1 * | 8/2011 | Shteynberg | H05B 45/46 315/186 |
| 2012/0313528 | A1 * | 12/2012 | Chen | H05B 47/23 315/121 |
| 2017/0231045 | A1 * | 8/2017 | Hu | H05B 45/395 |
| 2019/0132923 | A1 * | 5/2019 | Rumer | H05B 45/22 |
| 2021/0150700 | A1 | 5/2021 | Wang | |
| 2021/0160989 | A1 | 5/2021 | Ichikawa | |
| 2021/0342688 | A1 | 11/2021 | Wang | |
| 2022/0301144 | A1 | 9/2022 | Wang | |
| 2022/0301145 | A1 | 9/2022 | Wang | |

FOREIGN PATENT DOCUMENTS

| | | |
|---|---|---|
| KR | 20160001093 | 1/2016 |
| WO | 2019089658 | 5/2019 |
| WO | WO-2024102171 A1 | 5/2024 |

OTHER PUBLICATIONS

"International Application Serial No. PCT US2023 026626, International Search Report mailed Oct. 23, 2023", 3 pgs.
"International Application Serial No. PCT US2023 026626, Written Opinion mailed Oct. 23, 2023", 7 pgs.

* cited by examiner

*Primary Examiner* — Thai Pham
(74) *Attorney, Agent, or Firm* — Schwegman Lundberg & Woessner, P.A.

(57) ABSTRACT

In an example embodiment, the controller is designed with a single current sensing circuit that is able to measure the current on multiple LED channels, eliminating the need for each LED channel to have its own current sensing circuit. The current sensing circuit may further be utilized with a control unit, which has an LED control model selection multiplexor (MUX) that switches between real-time closed-loop control and open-loop control.

15 Claims, 7 Drawing Sheets

MULTI-CHANNEL LED CURRENT CONTROL CIRCUIT

TECHNICAL FIELD

This application relates generally to defect inspection. More particularly, this application relates to a multi-channel light emitting diode (LED) current control circuit for an imaging system.

BACKGROUND

During manufacturing quality control processes, especially high-volume production, a camera-based imaging system is usually implemented to take photos of the parts for automatic defect scanning. In the application of fly capture, when parts don't come to a stop in front of the camera, a high-speed camera capture with sufficient part illumination is required to ensure a clear image with no image blur, and there is also sometimes a need to execute multiple different combinations of light channels.

DETAILED DESCRIPTION

Figure 1:
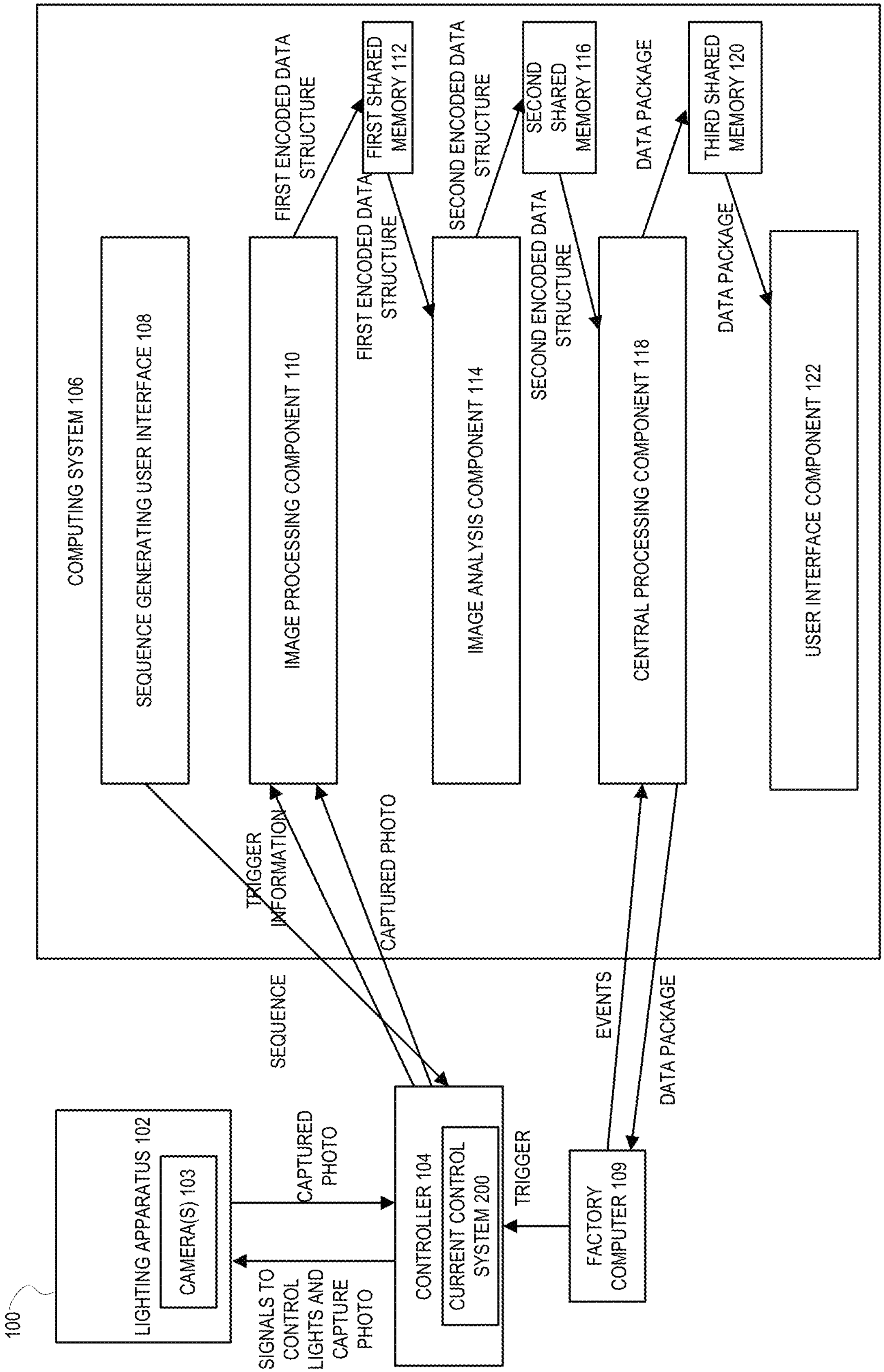
FIG. 1 is a block diagram illustrating an inspection camera system, in accordance with an example embodiment.

The traditional method for current sensing on multiple LED channels usually implements current sensing and real-time feedback control for every single LED channel circuit. Yet this implementation requires a current sensing circuit for each LED channel. Therefore, hardware cost increases as the LED channel counts increase. In addition, when multiple LED channels are operating at the same time, real-time control for all channels at the same time throttles the Central Processing Unit (CPU) computing power. Expensive parallel computing hardware and software development are needed for real-time control over multiple LED channels.

Furthermore, a very bright light source is needed in order to aid with high-speed fly capture. and this light source needs to be very consistent in color temperature and brightness. Therefore, a specially designed controller is required to provide accurate current control over each LED channel.

An inspection camera may be improved by improving the design of a lighting apparatus to increase light in various scenarios. More particularly, rather than a single light source, which provides inadequate light for capturing an image with quality sufficient to ascertain the existence of surface defects on all surface materials on various components or products, a lighting apparatus having multiple light sources may be provided. Furthermore, a controller for the lighting apparatus may be provided that allows for the multiple light sources to be independently controlled, allowing for lighting combinations and sequences to be utilized to maximize the flexibility of the lighting apparatus to provide sufficient light for a number of different products, components, materials, and environments.

In an example embodiment, the controller is designed with a single current sensing circuit that is able to measure the current on multiple LED channels, eliminating the need for each LED channel to have its own current sensing circuit. The current sensing circuit may further be utilized with a control unit, which has an LED control model selection multiplexor (MUX) that switches between real-time closed-loop control and open-loop control.

Managing the various different lighting combinations and sequences, however, creates a technical challenge. There may be many different components in a single assembly or manufacturing line, a variety of different potential defects on the surface, and a variety of different environmental scenarios that might alter the ability of the lighting apparatus to properly produce an image useful for analysis. Furthermore, as the number of different controllable lights on the lighting apparatus increases, the technical challenge becomes exponentially more difficult.

In an example embodiment, a controller and computer system are provided for a lighting apparatus that addresses this technical challenge. More particularly, users are able to use the computer system to define a sequence of one or more capture configurations. Each capture configuration includes identification(s) of one or more light sources to illuminate during an image capture, one or more channels to use to capture the image, and an exposure time. Each sequence can further define custom delays between capture configurations within the sequence.

Upon receipt of a trigger from either hardware or software, the controller then fires the stored sequence, which takes images using a camera based on the captured configurations (and delays). Artificial intelligence techniques can then be applied to the captured images to identify suspected defects in components captured in the images.

The description that follows includes illustrative systems, methods, techniques, instruction sequences, and computing machine program products that have illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

FIG. 1 is a block diagram illustrating an inspection camera system 100, in accordance with an example embodiment. The inspection camera system 100 may include a lighting apparatus 102, a controller 104, and a computing system 106. The lighting apparatus 102 includes a plurality of different lights, such as LED lights that are separately controllable by the controller 104. This means that the lights can be turned on and off independently of one another, allowing the lighting apparatus 102 to have some, but not all, of its lights on at any given time. In some example embodiments, the brightness of each of the lights can also be independently controlled, so that a light can have a custom level of brightness/dimness in addition to merely being on or off.

The lighting apparatus 102 further may include one or more cameras 103. Each of these cameras 103 can also be independently controlled to take pictures/capture images when signaled. Variables such as exposure time can also be independently controlled.

In an example embodiment, the lighting apparatus 102 is a light dome. The light dome in use illuminates a target object, such as a metal casting or other product. The light dome includes a housing containing a number of light sources as will be described in more detail below. In some examples, the light sources comprise a plurality of LEDs or display screens arranged to provide flexibility in illuminating the target object.

The one or more cameras, which may be mounted to the light dome by a bracket, capture images of the illuminated target object through a hole in the top of the light dome.

The controller 104 is an electronic component that is designed to send signals to the lighting apparatus 102 via one or more channels to control the lights on the lighting apparatus 102.

The computing system 106 includes a variety of different software components, running on a computing hardware platform. These components include a sequence generating user interface 108. The sequence generating user interface 108 allows a user to create a sequence as an ordered combination of capture configurations, optionally separated by customized delays. The created sequence may then be stored on the controller 104, such as in a memory component in the controller 104. Upon receipt of an external trigger, the controller 104 then retrieves the sequence and fires the sequence, meaning the capture configurations in the sequence are used to control the lighting apparatus 102 according to the parameters defined in each capture configuration, separated by the custom delays.

The external trigger may be either a hardware trigger (such as from a programmable logic controller) or a software trigger (such as from an industrial personal computer (PC)). In some example embodiments, one or more of the triggers may be received from a factory computer 109. Once the trigger occurs, the sequence fires, which controls the lighting apparatus 102 to light the appropriate lights at the appropriate time and also to trigger the camera or cameras to take pictures/capture images at the appropriate times.

The controller 104 sends information about the trigger, along with a time stamp, to an image processing component 110 on the computing system 106. The controller 104 also receives the photo(s) from the lighting apparatus 102, time stamps them, and sends the timestamped images to the image processing component 110. The image processing component 110 then encodes a data package, which includes photo(s), capture configuration information, timestamps, camera identifications, and other information, in a data structure or data structures, which is/are then stored in first shared memory 112.

An image analysis component 114 then retrieves this data structure and decodes it. The capture configuration information is used to retrieve an artificial intelligence model corresponding to the capture configuration. Each capture configuration has its own artificial intelligence model, although some capture configurations may have more than one artificial intelligence model. In an example embodiment, no artificial intelligence model is shared between or among two or more capture configurations.

The artificial intelligence model acts to use artificial intelligence to perform one or more image analysis tasks on the image(s). These tasks may include, for example, creating a mask for the image that makes one or more inferences on the image regarding one or more defects in components captured in the image.

The image analysis component 114 then encodes the results of these image analysis tasks into another data structure. This data structure may include, for example, inferred masks, network information, and defect types. This data structure is then stored in a second shared memory 116.

A CPU 118 then retrieves the data structure from the second shared memory 116 and performs time stamp sorting on the data in the data structure, using information obtained from the programmable logic controller, such as part identification, inspection identification, inspection ready, part start, part end, and so forth. It then packages the sorted data into a data package that is stored in a third shared memory 120. The data package may include, for example, a part identification, inspection identification, camera identification, image, inference mask, other inference post processing results, error codes, and the like.

A user interface component 122 is then provided that can access the data package in the third shared memory 120 and display portions of it to a user via a graphical user interface. Here, a user may specify an inspection mode (such as manual or automatic), and can also add customer-specific settings, such as image display settings, how and whether to upload the image into a cloud environment, and the like.

It should be noted that in some example embodiments, the user interface component 122 and the sequence generating user interface 108 may be combined into a single component. In other words, the sequence defining capabilities of user interface 108 may be combined with the output and settings-related capabilities of the user interface component 122.

Figure 2:
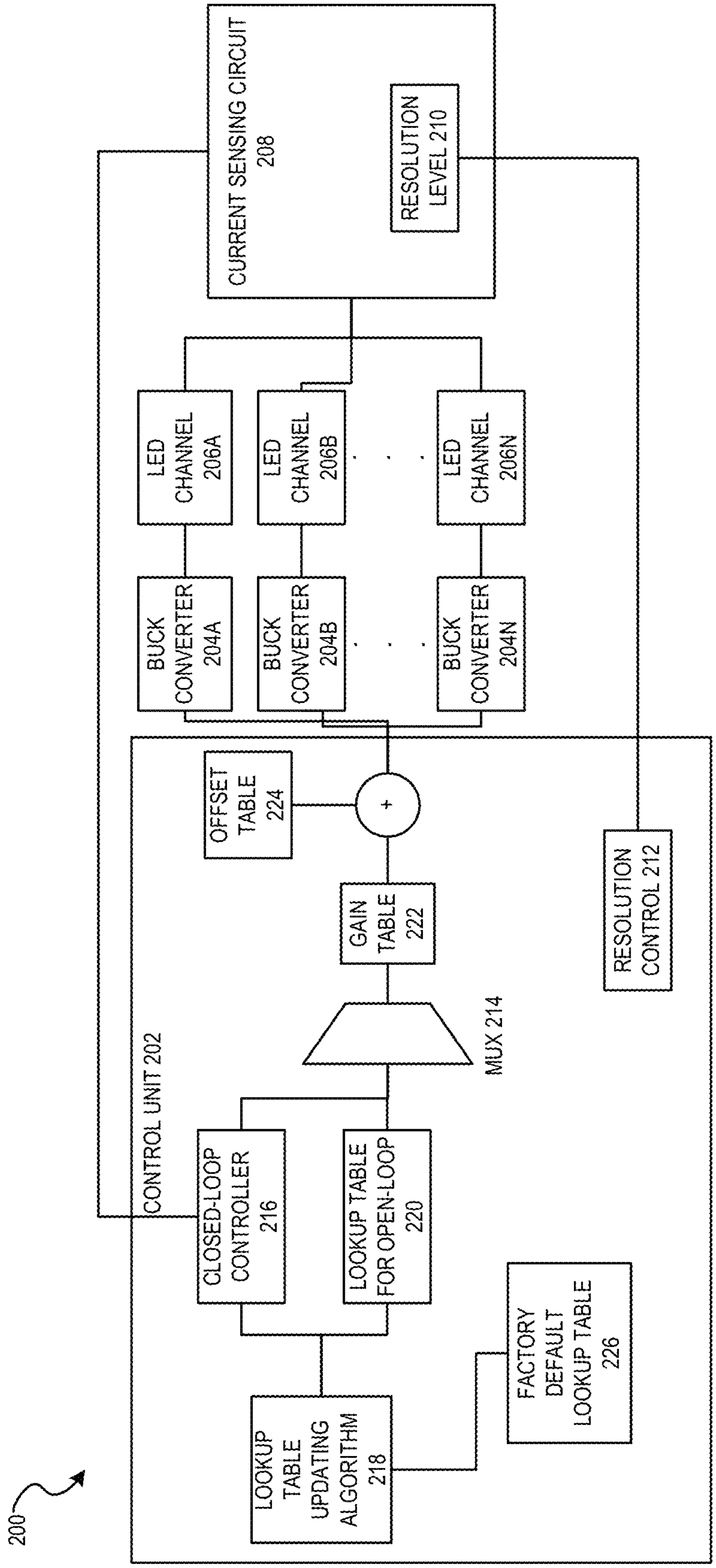
FIG. 2 is a block diagram illustrating a current control system, in accordance with an example embodiment.

In an example embodiment, the controller 104 includes a current control system where multiple LED channels share the same current sensing circuit. FIG. 2 is a block diagram illustrating a current control system 200, in accordance with an example embodiment. The current control system 200 includes a control unit 202, a plurality of buck converters 204A-204N, a plurality of LED channels 206A-206N, and a current sensing circuit 208. The current sensing circuit 208 maintains a current sensing resolution level 210, which can be dynamically specified by a resolution control 212 in the control unit 202. Each buck converted acts to step down voltage from the corresponding LED channel 206A-206N prior to it being received by the current sensing circuit 208.

Figure 3:
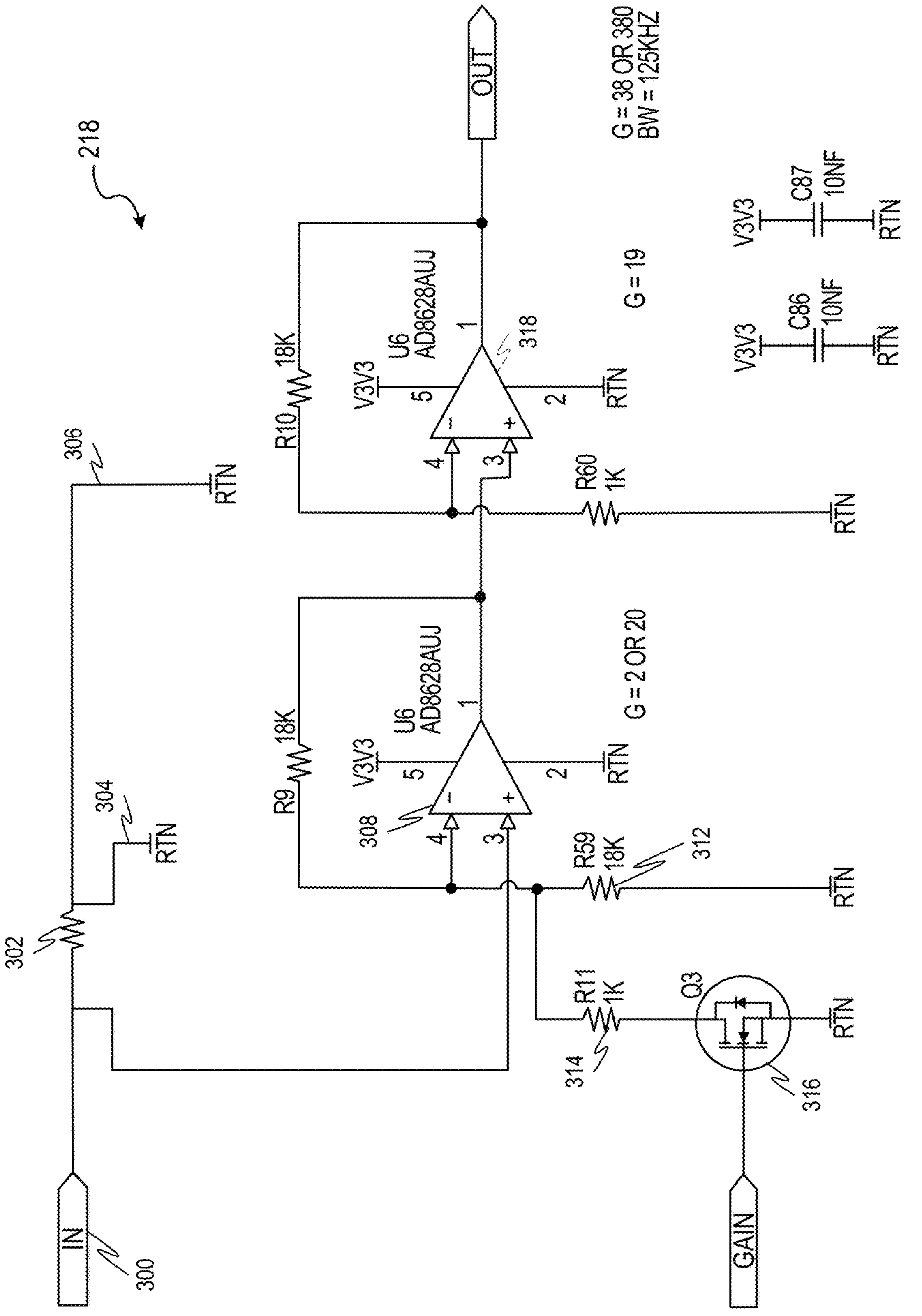
FIG. 3 is a circuit diagram illustrating a current sensing circuit, in accordance with an example embodiment.

FIG. 3 is a circuit diagram illustrating a current sensing circuit 208, in accordance with an example embodiment. Here, current input 300 is connected to resistor 302, which has two return lines 304, 306 on its output. The current input 300 is also connected to amplifier 308. Amplifier 308 also receives as input a line connected to resistor 312 and resistor 314. Resistor 312 is connected to an N-channel MOSFET with diode protection 316, which takes as input a gain line and a return line. The gain line drives gain to be applied to one or more channels based on a gain table. An N-channel MOSFET is a type of metal oxide semiconductor field-effect transition (FET). This type of transistor is also sometimes known as an insulated-gate field effect transistor IGFET) or metal-insulator field-effect transistor (MIFET). When the N-channel MOSFET is activated as ON, this condition results in the maximum amount of current flow through the channel. Amplifier 308 is connected to amplifier 318, which also takes as input a connection to a return line.

Referring back to FIG. 2, in an example embodiment, an LED control model selection multiplexor (MUX) 214 in the control unit 202 switches between real-time closed-loop control and open-loop control.

During a real-time feedback control mode, a single LED channel current is controlled during an LED calibration process. The LED calibration process can happen whenever there is no image capture action. For example, calibration may occur after each image capture and before the next scheduled image capture. During the feedback control process, the MUX 214 selects a real-time closed-loop control mode. One example, for real-time feedback, control is the discrete time proportional controller described by the equation:

$$PWM(i)=PWM(i-1)-k*e(i-1)$$

Where PWM(i) is the latest Pulse-Width Modulation (PWM) value, PWM(i−1) is the last PWM value, k is a proportional gain, e(i−1) is the last difference between the output and the reference, and the latest PWM(i) will be stored in the lookup table.

Other control methods include, but are not limited to, a controller, model-based predictive control, or other control algorithms. A closed-loop controller 216 also sends the control value to a lookup table updating algorithm 218 for open-loop control.

A lookup table updating mechanism, using the lookup table updating algorithm 218, takes in the real-time closed-loop controller data and keeps updating the lookup table for open-loop control 220.

The lookup table (or tables) for open-loop control 220 is used to compute the PWM frequency required for an LED channel given a set of variables. The variables include, but are not limited to: target electric current value, temperature, and time since last blink. The basic lookup table for target electric current value, given temperature Tk and time since last blink tk, has the following structure:

TABLE 1

| Tk, tk | A1 | A2 | . . . | Aj |
|---|---|---|---|---|
| LED Ch1 | PWM (1, 1) | PWM (1, 2) | . . . | PWM (1, j) |
| LED Ch2 | PWM (2, 1) | PWM (2, 2) | . . . | PWM (2, j) |
| . . . | . . . | . . . | . . . | . . . |
| LED Chi | PWM (i, 1) | PWM (i, 2) | . . . | PWM (i, j) |

PWM(i,j) represents the PWM frequency needed to deliver the amount of current Aj to LED channel i.

Different methods can be applied to the lookup table to calculate the PWM value if the current value does not match with the discrete Aj values (for example, linear interpolation and curve fitting method).

Figure 4:
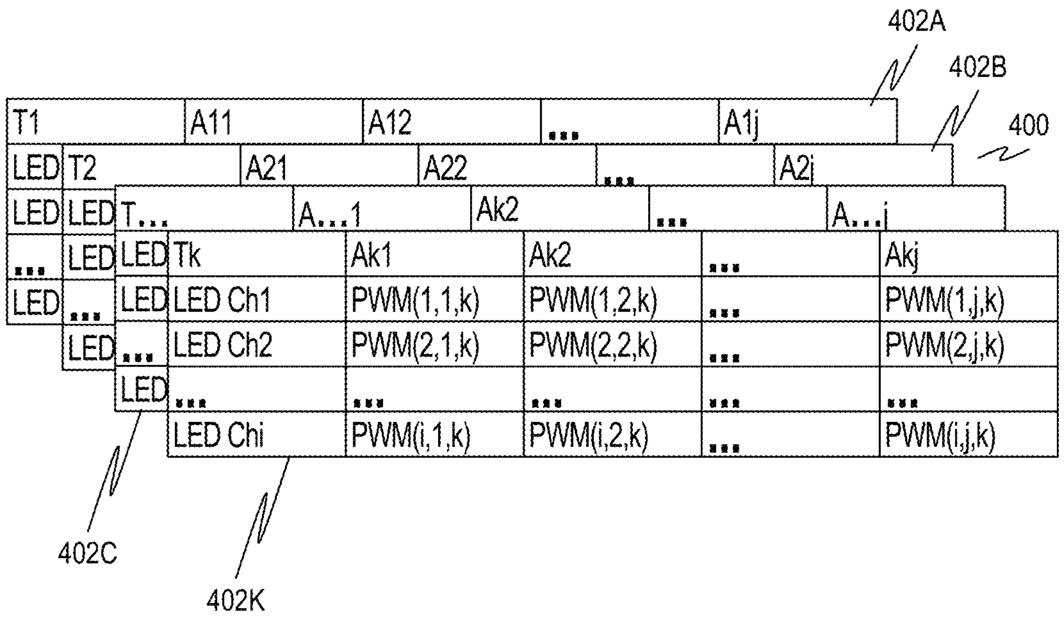
FIG. 4 is a block diagram illustrating a software architecture, which can be installed on any one or more of the devices described above.

Multiple tables can be implemented considering other parameters such as aforementioned temperature Tk. For example, the two-dimensional (2D) table is to be extended to three-dimensional (3D) table when including temperature Tk as depicted in FIG. 4. FIG. 4 is a diagram illustrating a 3D table 400, in accordance with an example embodiment. The 3D table 400 is comprised of a plurality of 2D tables 402A-402K, each of which corresponds to values for a different temperature value. This allows both temperature Tk and current Ak to be parameters used to determine the PWM frequency for a particular channel.

More parameters can be added to the table by increasing the table dimension: PWM(i,j,k,n,m,z, . . . ) Indeed, any number of dimensions can be used for the table 400.

Referring back to FIG. 2, a gain table 222 is also provided that multiplies the PWM value from the lookup table for open-loop control 220. An offset table 224 offsets the PWM value. This function is needed when the LEDs degrade over time by aging and the brightness or color temperature does not meet the spec anymore when the same amount of current is delivered to the LEDs. Therefore, in addition to a dynamically adjusted PWM for delivering accurate current, an additional gain and offset is needed to tune brightness or color temperature on top of current control. The gain table 222 and offset table 224 are calibrated during product maintenance. The following are examples of a gain table 222 and offset table 224:

TABLE 2

| | A1 | A2 | . . . | Aj |
|---|---|---|---|---|
| LED Ch1 | GAIN (1, 1) | GAIN (1, 2) | . . . | GAIN (1, j) |
| LED Ch2 | GAIN (2, 1) | GAIN (2, 2) | . . . | GAIN (2, j) |
| . . . | . . . | . . . | . . . | . . . |
| LED Chi | GAIN (i, 1) | GAIN (i, 2) | . . . | GAIN (i, j) |

TABLE 3

| | A1 | A2 | . . . Aj |
|---|---|---|---|
| LED Ch1 | OFFSET (1, 1) | OFFSET (1, 2) | . . . OFFSET (1, j) |
| LED Ch2 | OFFSET (2, 1) | OFFSET (2, 2) | . . . OFFSET (2, j) |
| . . . | . . . | . . . | . . . . . . |
| LED Chi | OFFSET (i, 1) | OFFSET (i, 2) | . . . OFFSET (i, j) |

A factory default lookup table 226 and system reset function are also provided. The product is calibrated at the factory default condition after production, giving a default PWM current control lookup table, a gain table of all elements of zero, and an offset table of all elements of zero. All values are to be reset to the default value upon customer requirements.

It should be noted that while the above describes a possible discrete-time controller, in some example embodiments the controller can be a continuous time feedback control, such as when there is only one light channel that needs to be operated. This may occur, for example, prior to the controller switching to lookup table feedback, such as when only one combination of LED channels is operating and there is no need to switch to other combinations.

Figure 5:
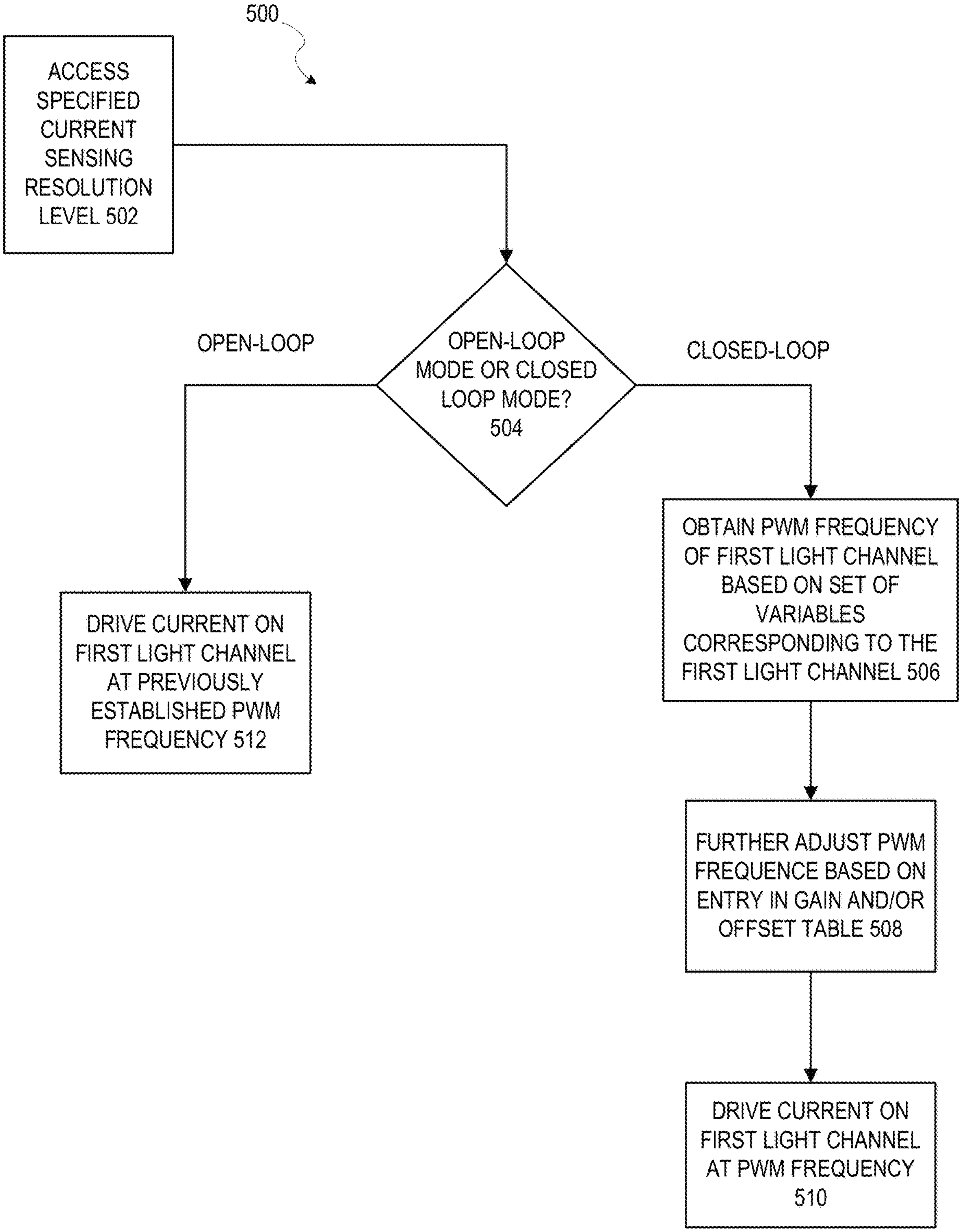
FIG. 5 is a flow diagram illustrating a method for operating a controller, in accordance with an example embodiment.

FIG. 5 is a flow diagram illustrating a method 500 for operating a controller, in accordance with an example embodiment. At operation 502, a specified current sensing resolution level may be accessed. This current sensing resolution level may be dynamically set by a CPU. In an example embodiment, the current sensing resolution level may be set dynamically at runtime based on a category, such as being set as either coarse or fine. At operation 504, it is determined whether the controller is in an open-loop mode or a closed-loop mode. If the controller is in a closed-loop mode, then at operation 506, a PWM frequency of a first light channel is obtained based on a set of variables corresponding to the first light channel. At operation 508, the PWM frequency is further adjusted based on an entry in a gain table, an entry in an offset table, or both. At operation 510, a current is driven on first light channel at the PWM frequency, based on a current sensing circuit sensing a current level the first light channel at the specified current sensing resolution level.

If at operation 504 it is determined that the controller is in an open-loop mode, then at operation 512 a current is driven on the first light channel at a previously established PWM frequency.

Figure 6:
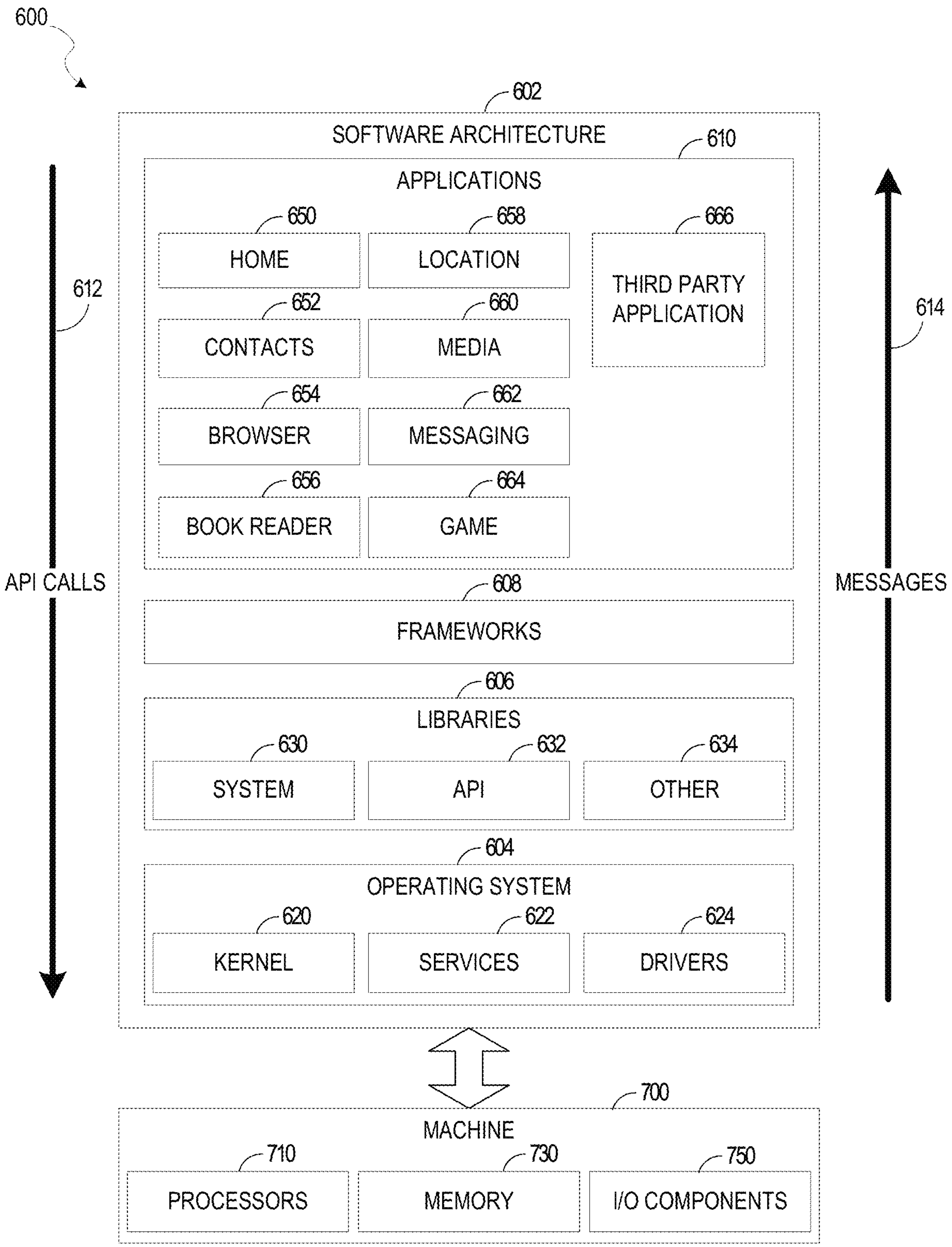
FIG. 6 illustrates a diagrammatic representation of a machine in the form of a computer system within which a set of instructions may be executed for causing the machine to perform any one or more of the methodologies discussed herein.

FIG. 6 is a block diagram 600 illustrating a software architecture 602, which can be installed on any one or more of the devices described above. FIG. 6 is merely a non-limiting example of a software architecture, and it will be appreciated that many other architectures can be implemented to facilitate the functionality described herein. In various embodiments, the software architecture 602 is implemented by hardware such as a machine 700 of FIG. 7 that includes processors 710, memory 730, and input/output (I/O) components 750. In this example architecture, the software architecture 602 can be conceptualized as a stack of layers where each layer may provide a particular functionality. For example, the software architecture 602 includes layers such as an operating system 604, libraries 606, frameworks 608, and applications 610. Operationally, the applications 610 invoke Application Program Interface (API) calls 612 through the software stack and receive messages 614 in response to the API calls 612, consistent with some embodiments.

In various implementations, the operating system 604 manages hardware resources and provides common services. The operating system 604 includes, for example, a kernel 620, services 622, and drivers 624. The kernel 620 acts as an abstraction layer between the hardware and the other software layers, consistent with some embodiments. For example, the kernel 620 provides memory management, processor management (e.g., scheduling), component management, networking, and security settings, among other functionality. The services 622 can provide other common services for the other software layers. The drivers 624 are responsible for controlling or interfacing with the underlying hardware. For instance, the drivers 624 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 606 provide a low-level common infrastructure utilized by the applications 610. The libraries 606 can include system libraries 630 (e.g., C standard library) that can provide functions such as memory allocation functions, string manipulation functions, mathematic functions, and the like. In addition, the libraries 606 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 606 can also include a wide variety of other libraries 634 to provide many other APIs to the applications 610.

The frameworks 608 provide a high-level common infrastructure that can be utilized by the applications 610. For example, the frameworks 608 provide various graphical user interface functions, high-level resource management, high-level location services, and so forth. The frameworks 608 can provide a broad spectrum of other APIs that can be utilized by the applications 610, some of which may be specific to a particular operating system 604 or platform.

In an example embodiment, the applications 610 include a home application 650, a contacts application 652, a browser application 654, a book reader application 656, a location application 658, a media application 660, a messaging application 662, a game application 664, and a broad assortment of other applications, such as a third-party application 666. The applications 610 are programs that execute functions defined in the programs. Various programming languages can be employed to create one or more of the applications 610, structured in a variety of manners, such as object-oriented programming languages (e.g., Objective-C, Java, or C++) or procedural programming languages (e.g., C or assembly language). In a specific example, the third-party application 666 (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating system. In this example, the third-party application 666 can invoke the API calls 612 provided by the operating system 604 to facilitate functionality described herein.

Figure 7:
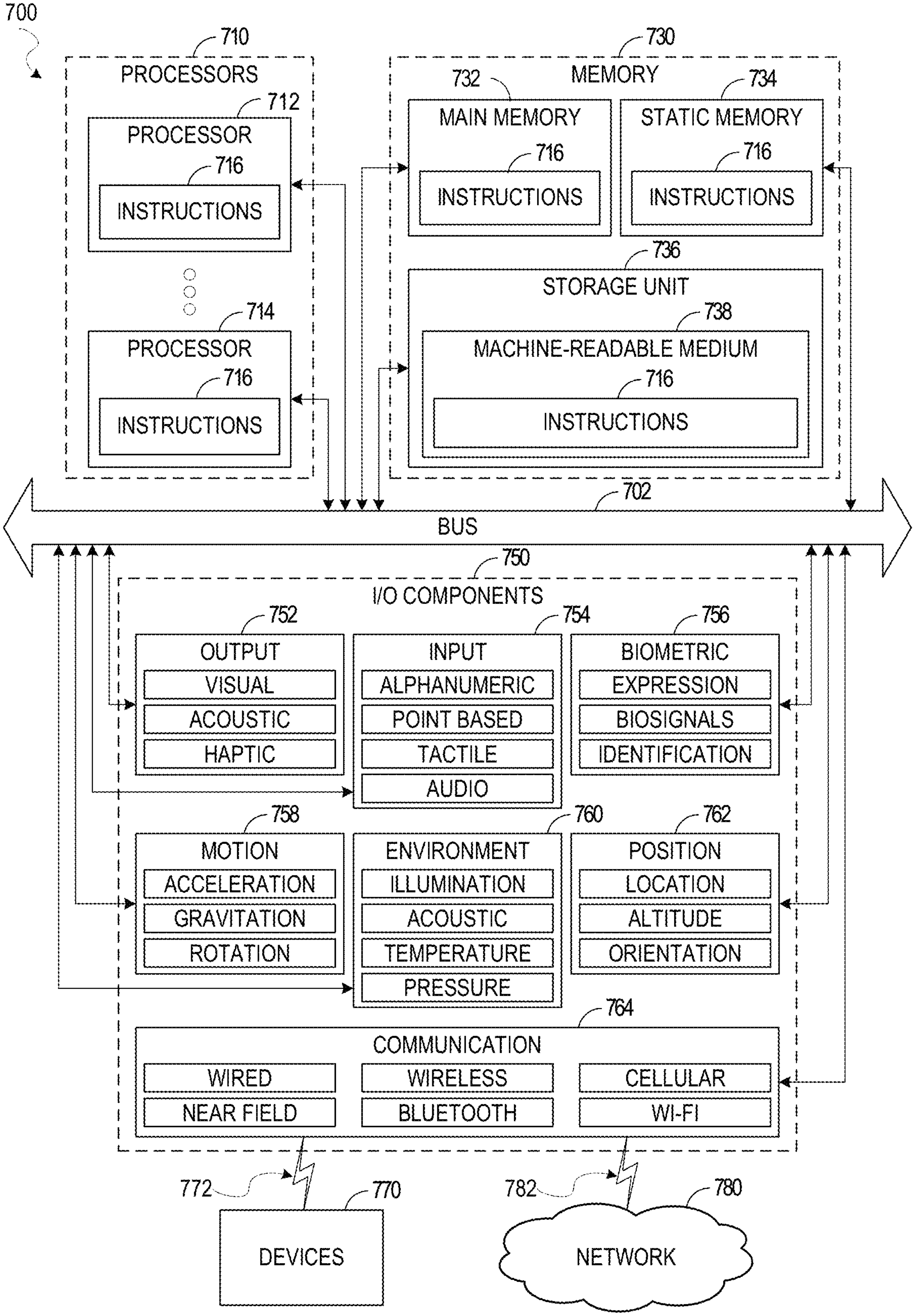
FIG. 7 is a block diagram illustrating a software architecture, which can be installed on any one or more of the devices described above.

FIG. 7 illustrates a diagrammatic representation of a machine 700 in the form of a computer system within which a set of instructions may be executed for causing the machine 700 to perform any one or more of the methodologies discussed herein. Specifically, FIG. 7 shows a diagrammatic representation of the machine 700 in the example form of a computer system, within which instructions 716 (e.g., software, a program, an application, an applet, an app, or other executable code) cause the machine 700 to perform any one or more of the methodologies discussed herein to be executed. For example, the instructions 716 may cause the machine 700 to execute the method of FIG. 5. Additionally, or alternatively, the instructions 716 may implement FIGS. 1-5 and so forth. The instructions 716 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory 730, and I/O components 750, which may be configured to communicate with each other such as via a bus 702. In an example embodiment, the processors 710 (e.g., a CPU, a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 712 and a processor 714 that may execute the instructions 716. The term "processor" is intended to include multi-core processors that may comprise two or more independent processors (sometimes referred to as "cores") that may execute instructions 716 contemporaneously. Although FIG. 7 shows multiple processors 710, the machine 700 may include a single processor 712 with a single core, a single processor 712 with multiple cores (e.g., a multi-core processor 712), multiple processors 712, 714 with a single core, multiple processors 712, 714 with multiple cores, or any combination thereof.

The memory 730 may include a main memory 732, a static memory 734, and a storage unit 736, each accessible to the processors 710 such as via the bus 702. The main memory 732, the static memory 734, and the storage unit 736 store the instructions 716 embodying any one or more of the methodologies or functions described herein. The instructions 716 may also reside, completely or partially, within the main memory 732, within the static memory 734, within the storage unit 736, within at least one of the processors 710 (e.g., within the processor's cache memory), or any suitable combination thereof, during execution thereof by the machine 700.

The I/O components 750 may include a wide variety of components to receive input, provide output, produce output, transmit information, exchange information, capture measurements, and so on. The specific I/O components 750 that are included in a particular machine will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7 7. The I/O components 750 are grouped according to functionality merely for simplifying the following discussion, and the grouping is in no way limiting. In various example embodiments, the I/O components 750 may include output components 752 and input components 754. The output components 752 may include visual components (e.g., a display such as a plasma display panel (PDP), a LED display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 750 may include biometric components 756, motion components 758, environmental components 760, or position components 762, among a wide array of other components. For example, the biometric components 756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 762 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 or devices 770 via a coupling 782 and a coupling 772, respectively. For example, the communication components 764 may include a network interface component or another suitable device to interface with the network 780. In further examples, the communication components 764 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., coupled via a USB).

Moreover, the communication components 764 may detect identifiers or include components operable to detect identifiers. For example, the communication components 764 may include radio-frequency identification (RFID) tag reader components, NFC smart tag detection components, optical reader components (e.g., an optical sensor to detect one-dimensional bar codes such as Universal Product Code (UPC) bar codes, multi-dimensional bar codes such as a quick response (QR) code, Aztec code, Data Matrix, Dataglyph, Maxi Code, PDF417, Ultra Code, UCC RSS-2D bar code, and other optical codes), or acoustic detection components (e.g., microphones to identify tagged audio signals). In addition, a variety of information may be derived via the communication components 764, such as location via Internet Protocol (IP) geolocation, location via Wi-Fi® signal triangulation, location via detecting an NFC beacon signal that may indicate a particular location, and so forth.

The various memories (e.g., 730, 732, 734, and/or memory of the processor(s) 710) and/or the storage unit 736 may store one or more sets of instructions 716 and data structures (e.g., software) embodying or utilized by any one or more of the methodologies or functions described herein. These instructions (e.g., the instructions 716), when executed by the processor(s) 710, cause various operations to implement the disclosed embodiments.

As used herein, the terms "machine-storage medium," "device-storage medium," and "computer-storage medium" mean the same thing and may be used interchangeably. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 780 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 8G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 716 may be transmitted or received over the network 780 using a transmission medium via a network interface device (e.g., a network interface component included in the communication components 764) and utilizing any one of a number of well-known transfer protocols (e.g., Hypertext Transfer Protocol (HTTP)). Similarly, the instructions 716 may be transmitted or received using a transmission medium via the coupling 772 (e.g., a peer-to-peer coupling) to the devices 770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 716 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The invention claimed is:

1. A system comprising:

a lighting apparatus including a plurality of independently controllable light sources and at least one camera; and a controller comprising:

a current sensing circuit operatively coupled to a plurality of light channels, each light channel of the plurality of light channels being operatively coupled to a different one of the plurality of independently controllable light sources, the current sensing circuit being configured to sense a current level on each light channel of the plurality of light channels at a dynamically specified current sensing resolution level;

a control unit;

a plurality of buck converters operatively coupled to the plurality of light channels, between the control unit and a corresponding independently controllable light source, each buck converter acting to step down voltage from the corresponding independently controllable light source prior to it being received by the control unit; and a multiplexor designed to switch between a closed-loop mode and an open-loop mode for the current sensing circuit, wherein the closed-loop mode includes a feedback mechanism from a closed-loop controller to the current sensing circuit such that a pulse width modulation (PWM) frequency of a light channel is adjusted based on a set of variables, wherein the open-loop mode does not include the feedback mechanism.

2. The system of claim 1, wherein the set of variables include variables selected from target electric current value, temperature, or time since last blink.

3. The system of claim 2, wherein values for the variables are found in a lookup table organized by light channel.

4. The system of claim 1, wherein the PWM frequency of a light channel is modified based on a gain table to compensate for age of a corresponding independently controllable light source.

5. The system of claim 1, wherein the PWM frequency of a light channel is modified based on an offset table to compensate for age of a corresponding independently controllable light source.

6. The system of claim 1, wherein the current sensing resolution level is set at either coarse or fine.

7. The system of claim 1, wherein the current sensing resolution level is set at runtime by the control unit.

8. The system of claim 1, wherein the closed-loop mode is used when there is no image capture action being performed by the camera.

9. The system of claim 8, wherein the closed-loop mode is used immediately after an image capture action but before a next scheduled image camera action.

10. The system of claim 1, wherein the feedback mechanism is a discrete time proportional controller that applies a formula:

$$PWM(i)=PWM(i-1)-k*e(i-1)$$

where PWM(i) is a latest Pulse-Width Modulation (PWM) value, PWM(i−1) is a last PWM value, k is a proportional gain, and e(i−1) is a last difference between an output and a reference.

11. The system of claim 1, wherein the feedback mechanism is a model-based predictive controller.

12. The system of claim 1, wherein the control unit is capable of performing operations stored on a computer-readable medium and executable by at least one hardware processor, comprising:

accessing a specified current sensing resolution level;

determining whether the controller is in an open-loop mode or a closed-loop mode;

in response to a determination that the controller is in a closed-loop mode, adjusting a pulse width modulation (PWM) frequency of a light channel based on a set of variables; and driving a current on the light channel at the PWM frequency, based on a current sensing circuit sensing a level of current of the light channel at the specified current sensing resolution level.

13. A system comprising:

a lighting apparatus including a plurality of independently controllable light sources and at least one camera; and a controller comprising:

a current sensing circuit operatively coupled to a plurality of light channels, each light channel of the plurality of light channels being operatively coupled to a different one of the plurality of independently controllable light sources, the current sensing circuit being configured to sense a current level on each light channel of the plurality of light channels at a dynamically specified current sensing resolution level, the current sensing resolution level being dynamically settable at a setting of either coarse or fine;

a control unit; and a plurality of buck converters operatively coupled to the plurality of light channels, between the control unit and a corresponding independently controllable light source, each buck converter acting to step down voltage from the corresponding independently controllable light source prior to it being received by the control unit.

14. A system comprising:

a lighting apparatus including a plurality of independently controllable light sources and at least one camera; and a controller comprising:

a current sensing circuit operatively coupled to a plurality of light channels, each light channel of the plurality of light channels being operatively coupled to a different one of the plurality of independently controllable light sources, the current sensing circuit being configured to sense a current level on each light channel of the plurality of light channels at a dynamically specified current sensing resolution level, the current sensing resolution level being dynamically set at runtime by a control unit; and a plurality of buck converters operatively coupled to the plurality of light channels, between the control unit and a corresponding independently controllable light source, each buck converter acting to step down voltage from the corresponding independently controllable light source prior to it being received by the control unit.

15. A system comprising:

a lighting apparatus including a plurality of independently controllable light sources and at least one camera; and a controller comprising:

a current sensing circuit operatively coupled to a plurality of light channels, each light channel of the plurality of light channels being operatively coupled to a different one of the plurality of independently controllable light sources, the current sensing circuit being configured to sense a current level on each light channel of the plurality of light channels at a dynamically specified current sensing resolution level;

a control unit, the control unit performing operations stored on a computer-readable medium and executable by one or more hardware processors, comprising:

accessing a specified current sensing resolution level;

determining whether the controller is in an open-loop mode or a closed-loop mode;

in response to a determination that the controller is in a closed-loop mode, adjusting a pulse width modulation (PWM) frequency of a light channel based on a set of variables; and driving a current on the light channel at the PWM frequency, based on a current sensing circuit sensing a level of current of the light channel at the specified current sensing resolution level; and a plurality of buck converters operatively coupled to the plurality of light channels, between the control unit and a corresponding independently controllable light source, each buck converter acting to step down voltage from the corresponding independently controllable light source prior to it being received by the control unit.

* * * * *